(12) United States Patent
Miyabukuro

(10) Patent No.: US 6,386,717 B2
(45) Date of Patent: May 14, 2002

(54) EXTERNAL REARVIEW MIRROR

(75) Inventor: Pedro Takashi Miyabukuro, Santo André (BR)

(73) Assignee: Metagal Industria e Commercio LTDA, Sao Paulo (BR)

( * ) Notice: Subject to any disclaimer, the term of this patent is extended or adjusted under 35 U.S.C. 154(b) by 0 days.

(21) Appl. No.: 09/793,951

(22) Filed: Feb. 27, 2001

(30) Foreign Application Priority Data

Mar. 2, 2000 (BR) ........................................ 8000 292 U

(51) Int. Cl.⁷ .............................................. G02B 7/182
(52) U.S. Cl. ...................... 359/879; 359/880; 359/871; 359/872; 359/841
(58) Field of Search ................................ 359/879, 880, 359/871, 872, 841, 842, 843, 874; 74/300.5, 502.1, 502.4, 502.6; 248/549, 477, 478, 479

(56) References Cited

U.S. PATENT DOCUMENTS

| | | | | |
|---|---|---|---|---|
| 3,659,477 A | * | 5/1972 | Wehner | 74/501 |
| 4,490,012 A | * | 12/1984 | Magiske | 350/637 |
| 4,628,760 A | * | 12/1986 | Huddleston | 74/501 R |
| 5,375,014 A | * | 12/1994 | Fujie et al. | 359/841 |
| 5,557,476 A | * | 9/1996 | Oishi | 359/841 |
| 5,828,504 A | * | 10/1998 | Beuzeville | 359/841 |
| 6,024,460 A | * | 2/2000 | Robbins et al. | 359/872 |

* cited by examiner

Primary Examiner—Mohammad Sikder
(74) Attorney, Agent, or Firm—Michael J. Striker

(57) ABSTRACT

An external rearview mirror, has a mirror plate; a regulating mechanism for position regulation of said mirror plate, by moving the mirror plate, a transmission device including a sole transmission cable formed as an internal cable, an external sleeve; fixed in a housing the mechanism, and a button connected with the cable so that the cable can be pulled or pushed inside a sleeve against a force of a spring depending of movements of the button.

6 Claims, 2 Drawing Sheets

EXTERNAL REARVIEW MIRROR

BACKGROUND OF THE INVENTION

The present invention relates generally to external rearview mirrors, as accessories for automotive vehicles.

External rearview mirrors are known and widely utilized. They usually include a mirror, a regulating device for positioning the mirror, a housing accommodating the mechanism and the mirror, a base in which the housing is fixed laterally to the vehicle body. The mechanism is formed so as to provide a remote activation. It usually includes an articulation with one part placed in the mirror plate and another part placed in the housing. There are three connection cables connecting to the adequate points of the articulation. A mirror is placed in the interior of a compartment of the vehicle, and opposite ends of the cables are connected to it.

The known external rearview mirrors perform their required functions. However they are inconvenient since they have a complicated structure particularly with regard to the mechanism for position regulation of the plate with three cables. The complexity of this mechanism is not only due to the three cables, but also because the articulation has also a complicated construction, to operate with three cables according to the functioning of the mechanism. The complicated construction requires a difficult manufacturing process, and increases the cost as well as causes other inconveniences.

SUMMARY OF THE INVENTION

Accordingly, it is an object of the present invention to provide an external rearview mirror, which eliminates the disadvantages of the prior art.

In particular, it is an object of the present invention to provide an external rearview mirror which has a simplified construction, in particular of its regulating mechanism for positioning of the mirror plate.

It is also an object of the present invention to provide an external rearview mirror with such a mechanism which simplifies the manufacturing process of the mirror, is efficient for its operating functions, and has a reduced cost.

In keeping with these objects and with others which will become apparent hereinafter, one feature of present invention resides, briefly stated, in an external rearview mirror which has a mirror plate; a regulating mechanism for position regulation of said mirror plate, a housing accommodating said mirror plate and said mechanism; a base in which a housing is arranged and which is fixable on a side of a vehicle body, said mechanism including an articulation with the first part associated with said mirror plate and a second part associated with said housing to provide movements of said mirror plate around a vertical geometric axis extending through said mirror plate; a transmission device including a sole transmission cable formed as an internal cable, and an external sleeve; an arm extending substantially perpendicular from said mirror plate and having a free end to which one end of said cable is anchored; a spring located opposite to said cable and anchored in said arm and having one end placed in an end of said arm and another end placed in said housing, said sleeve being fixed in said housing, said mechanism having a base mountable in a vehicle and fixed to another end of said sleeve of said transmission cable, and button means mounted on said base and connected with another end of said cable so that said cable can be pulled or pushed inside said sleeve in a direction against a force of said spring and in correspondence with the force of said spring depending of movements of said button.

When the external rearview mirror is designed in accordance with the present invention, it provides for the above mentioned highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
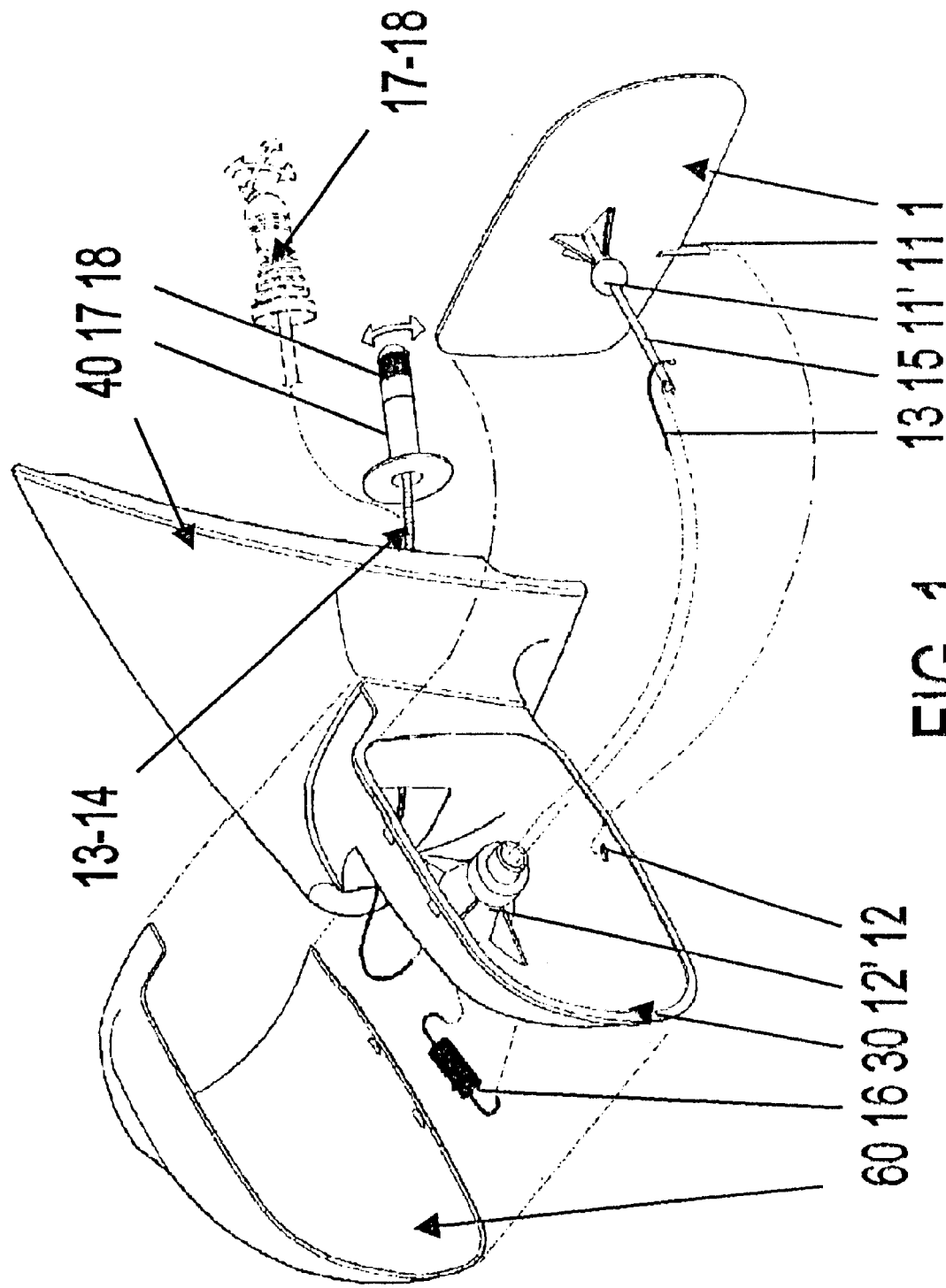
FIG. 1 is a view showing an exploded perspective view of an external rearview mirror in accordance with the present invention.
Figure 2:
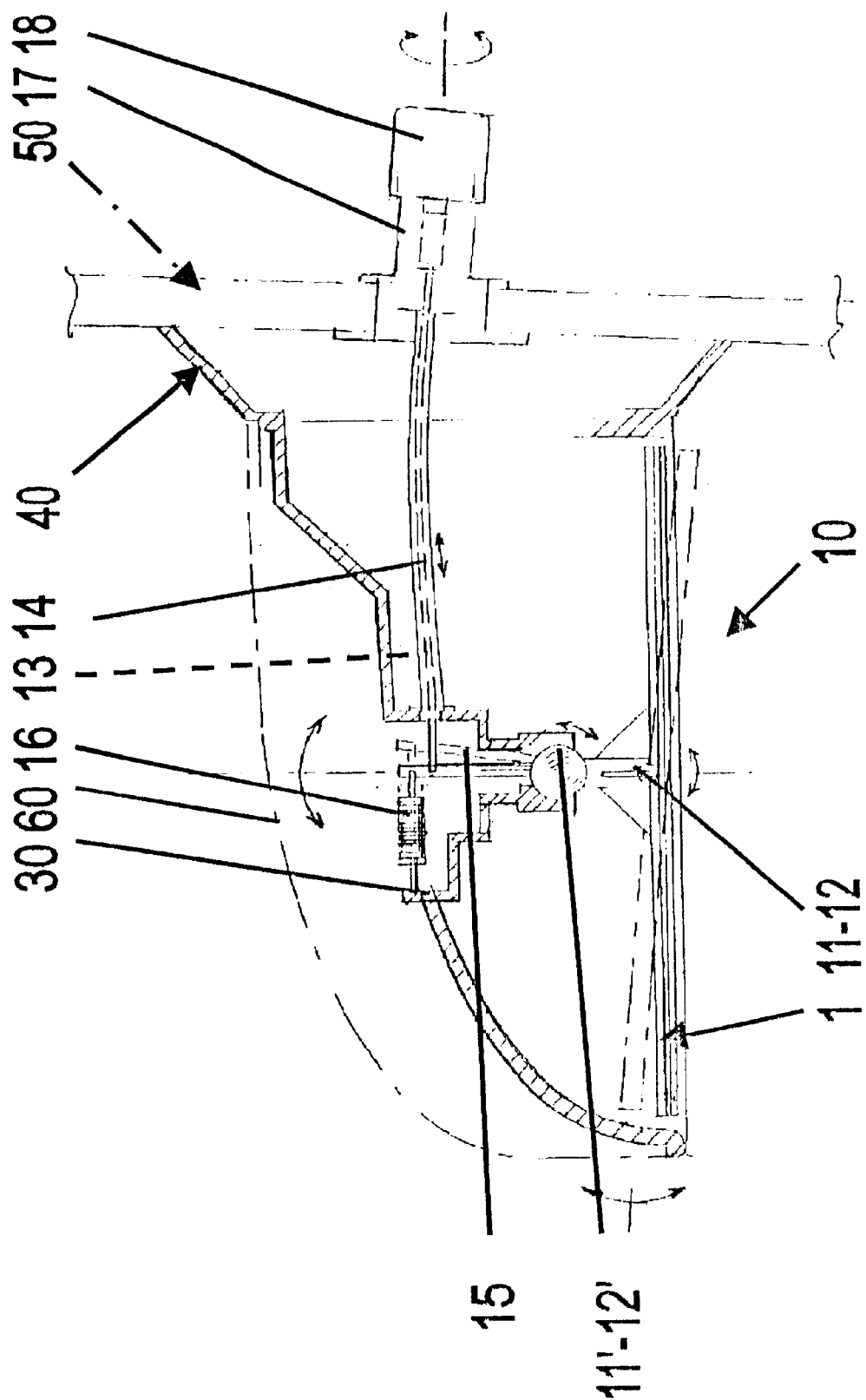
FIG. 2 is a view showing a mounting scheme of the external rearview mirror.

An external rearview mirror as shown in FIG. 1 has a mirror plate 1, a mechanism 10 for regulating a position of the mirror plate, a housing 30 which accommodates the mirror plate 1 and the mechanism 2, and a base 40. The housing 30 is arranged in the base 40, and the base 40 is fixed to a side of a vehicle body 50. The mechanism 10 is remotely activated and includes an articulation 11, 12 between the mirror plate 1 and the housing 30, a transmission 13, 14, 15, 16 for the mirror plate 1, and a remote activation button 17, 18 located inside the vehicle.

The articulation includes a first part 11 associated with a mirror plate 1 and a second part 12 associated with the housing 30 to provide an angular movement of the mirror plate around a vertical geometric axis. The transmission includes a transmission cable formed as an internal cable 13, an external sleeve 14, an arm 15 extending perpendicularly from a posterior face of the mirror plate 1 and having a free end in which one end of the cable 13 is angled, and a spring 16 opposite to the end of the cable 13 anchored in the arm 15. The opposite end of the spring is located in the region of the housing 30 between the place of the housing 30 provided with the arm 15 and the free end of the housing 30. The end of the sleeve 14 from which the end of the cable 13 extends and is connected to the arm 15 is fixed in the surface of the housing 30 adjacent to the above mentioned place where the end of the arm 15 is located.

The activation button includes a base 17 mounted in an internal surface of the vehicle. The other end of the sleeve 14 of the transmission cable is fixed in the base 17. The button further has a button member 18 mounted in the base 17 and connected to the other end of the cable 13, so that the cable is pulled or pushed inside the sleeve 14 against or in correspondence with the force of the spring 16, according to the movements of the button 18.

The articulation can also have an inferior articulation point provided by a vertical axle 11 which is fixed with a mirror plate 1 and extends in a vertical geometric axis of the mirror plate 1 to project from its inferior side. The articulation can further has a seat 12 in the anterior region of the inner wall of the housing 30, in which the vertical axle 11 is moved angularly. A superior articulation point can be formed by a first part 11' of the articulation in the center of the posterior face of the mirror plate 1, and the second part 12' in the center of the interior face of the posterior wall of the housing 30.

Optionally, the superior articulation point can be formed on the prolonged axis of the superior side of the mirror plate 1, and the corresponding seat can be formed in the anterior region of the superior wall of the housing 30.

The arm 15 in which the end of the cable 13 is connected is fixed and coaxial with the first part 11' of the articulation of the superior articulation point of the mirror plate 1. It projects from the later and crosses the central opening of the second part 12' of the articulation at the superior articulation point of the housing 30. Its free end remains slightly projecting from the external side of the posterior wall of the housing 30, and the end of the cable 13 is connected to it.

The button 17, 18 can be of a turning type as shown by solid lines in FIG. 1, or can be formed as a lever with orthogonal movements similar to a joystick as shown in dotted lines in FIG. 1.

The housing 30 can be formed as an internal body which accommodates the mirror plate 1 and the mechanism 10, and placed in the base 40 so as to receive a finishing cover 60.

The mirror plate 1 can be formed of a glass, a reflection layer, and a base for receiving the remaining parts which form the mirror. It is provided with the articulation parts 11, 11'.

An external rearview mirror in accordance with the present invention operates in the following manner.

When the user intends to regulate a position of the mirror plate 1 inside the housing 30 in order to better adjust the mirror plate, it activates the button 18 which pulls or pushes the cable 13 inside the sleeve 13. This makes the arm 1 5 move in an angular way in the horizontal plane so as to be closer to or farther from the vehicle body. Therefore the axle 11 and the articulation point 11' of the mirror plate 1 are articulated in the seat 12 and a part 12' of the articulation of the housing 30. As a result, the mirror set moves in an angularway around its geometrical vertical axis so as to provide a corresponding adjustment for a better vision of a posterior region of the vehicle.

When the external rearview mirror is designed in accordance with the present invention, then instead of conventional tree articulation cables and complex device, for actuating the cables, a sole cable is utilized which actuates together with a simple articulation set the positioning of the mirror plate.

The external rearview mirror therefore has a simple construction, is produced in a simple process and has a reduced cost.

It will be understood that each of the elements described above, or two or more together, may also find a useful application in other types of constructions differing from the types described above.

While the invention has been illustrated and described as embodied in external rearview mirror, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

What is claimed is:

1. An external rearview mirror, comprising a mirror plate, a regulating mechanism for position regulation of said mirror plate, a housing accommodating said mirror plate and said mechanism; a base in which a housing is arranged and which is fixable on a side of a vehicle body, said mechanism including an articulation with the first part associated with said mirror plate and a second part associated with said housing to provide movements of said mirror plate around a vertical geometric axis extending through said mirror plate; a transmission device including a sole transmission cable formed as an internal cable, and an external sleeve; an arm extending substantially perpendicular from said mirror plate and having a free end to which one end of said cable is anchored; a spring located opposite to said cable and anchored in said arm and having one end placed in an end of said arm and another end placed in said housing, said sleeve being fixed in said housing, said mechanism having a mechanism base mountable in a vehicle and fixed to another end of said sleeve of said transmission cable, and button means mounted on said mechanism base and connected with another end of said cable so that said cable can be pulled or pushed inside said sleeve in a direction against a force of said spring and in correspondence with the force of said spring depending of movements of said button means.

2. An external rearview mirror as defined in claim 1, wherein said articulation including a vertical axle connected with said mirror plate and extending in a vertical axis of said mirror plate, a seat located in an interior wall of said housing and movable angularly to said vertical axle; a first articulation point located in a center of a posterior face of said mirror plate; and a second articulation part located in a center of a posterior wall of said housing, said vertical axle forming an inferior articulation point while said first articulation part forming a superior articulation point.

3. An external rearview mirror as defined in claim 2, wherein said superior articulation point is located on a prolonged axis of a medium point of a superior side of said mirror plate, while said seat is located in an anterior medium point of a superior wall of said housing.

4. An external rearview mirror as defined in claim 2, wherein said arm at which an end of said cable is connected is coaxial with said first part of said articulation and extends laterally so as to cross a central opening of said second part of said articulation, and having a free end extending beyond said exterior face of a posterior wall of said housing to be connected with an end of said cable.

5. An external rearview mirror as defined in claim 1, wherein said button is of a gyratory type.

6. An external rearview mirror as defined in claim 1, wherein said button is of a lever type with orthogonal movements.

* * * * *